Sept. 13, 1927.
W. A. DISCH
1,641,963
VALVE GUIDE BUSHING
Filed Dec. 10, 1923
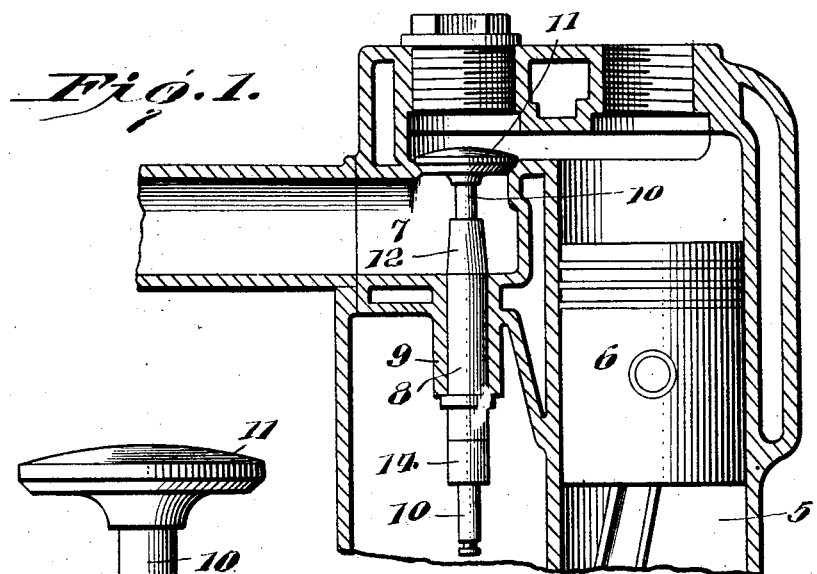
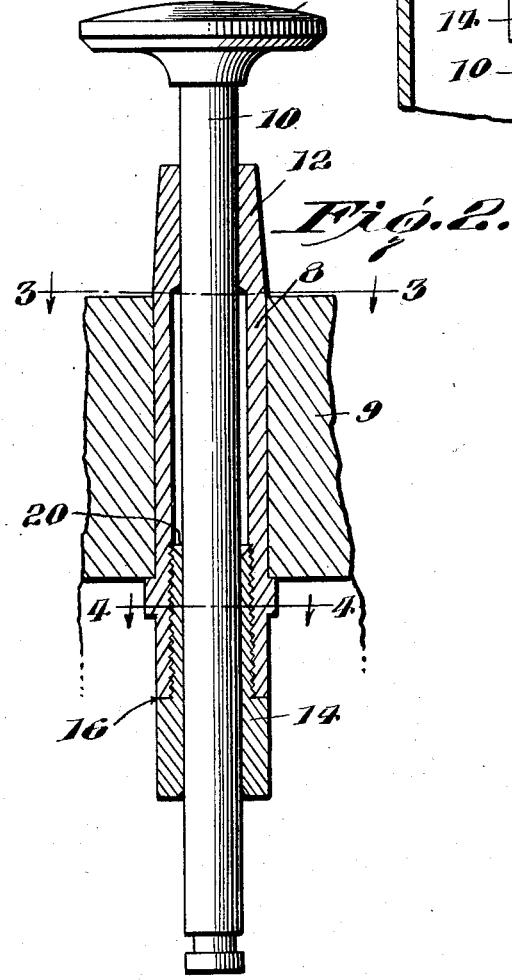
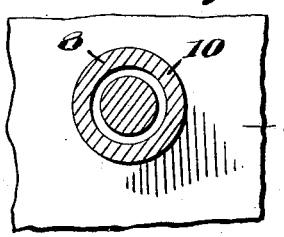
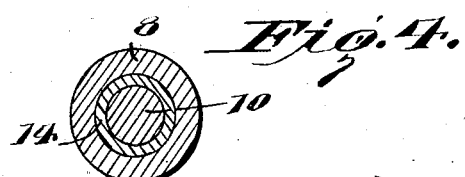
Inventor
William A. Disch,
By Milo B. Stevens Co.
Attorney Patented Sept. 13, 1927.

1,641,963

UNITED STATES PATENT OFFICE.

WILLIAM A. DISCH, OF CHICAGO, ILLINOIS.

VALVE-GUIDE BUSHING.

Application filed December 10, 1923. Serial No. 679,712.

This invention relates to valve guides especially adapted for use on internal combustion engines though not necessarily restricted to such use.

Briefly stated, an important object of this invention is to provide a valve guide wherein aligned spaced bearing members are provided and the valve guide being free from contact with the valve stem between the bearing members so that oil cannot readily pass up between the valve stem and the guide and carbonize the valve head and the seat therefor.

A further object is to provide a valve guide bushing wherein the spaced bearing members are held in accurate alignment so as to reduce the possibility of breakage to a minimum.

Other objects and advantages will be apparent during the course of the following description.

In the accompanying drawing forming a part of this application and in which like numerals are employed to designate like parts throughout the same, Figure 1 is a side elevation of the improved guide bushing applied.

Figure 2 is a vertical sectional view through the guide applied.

Figure 3 is a horizontal sectional view taken on line 3—3 of Figure 2.

Figure 4 is a horizontal sectional view taken on line 4—4 of Figure 2.

In the drawing wherein for the purpose of illustration is shown a preferred embodiment of the invention, the numeral 5 designates a cylinder within which a piston 6 is located and as shown in Figure 1 a valve cage 7 communicates with the combustion chamber of the engine. Of course the cage 7 may be either for intake or exhaust purposes.

In carrying out the invention the improved guide bushing 8 is rigidly fastened in a boss member 9 and receives the stem 10 of a valve 11. Figure 2 illustrates that the guide bushing 8 is counterbored for the major portion of its length to define an upper bearing member 12 for guiding the stem. In this respect the bearing member 12 co-operates with a lower supplemental bushing 14 of bronze or other suitable material.

Figure 2 illustrates that the bushing 14 is threaded into the lower portion of the sleeve 8 and has its rear portion enlarged to provide a contact shoulder 16 designed to bear against the lower end of the sleeve. As the supplemental bushing 14 is threaded into the lower portion of the sleeve 8 it is not likely to accidentally drop out of the sleeve or guide and is held in accurate alignment with the upper bearing member 8.

Particular attention is directed to the fact that the wall of the guide bushing 8 is spaced from the valve stem between the upper and lower bearings and consequently oil is prevented from freely passing up between the stem and the guide and collecting on the seat of the valve. That is to say, the oil splashed during the operation of the engine cannot creep up between the valve and the inner wall of the guide and form carbon deposits on the seat of the valve and prevent the proper seating of the valve. However, the arrangement is such that the lower supplemental bushing 14 is provided with an adequate supply of lubricant.

It will be seen with reference to Figure 2, that the supplemental bushing 14 extends a substantial distance into the sleeve 8 and terminates above the lower end of the boss 9 whereby the lower bearing is braced by and held in accurate alignment with the upper bearing at all times.

Also, the upper end of the lower bearing 14 is beveled inwardly as indicated at 20 so that any oil received in the annular chamber in the valve guide 8 is permitted to lubricate the bearing immediately below. With particular reference to Figure 2 it will be seen that the upper portion or end of the annular chamber is beveled so that oil within the annular chamber is directed into the upper bearing 12, whereby the upper and lower bearings are supplied with sufficient oil lubrication to avoid sticking of the stem and to avoid excessive wear. Therefore, the improved valve guide bushing not only functioned as a guide for the stem, but also as a lubricating means therefor. However, as the quantity of oil which is admitted to the annular chamber within the guide bushing 8 is limited, oil in excess quantities will not pass up through the bearing 12 and possibly cause carbon deposits on the valves or the valve seats.

Sticking valves, etc., are overcome by the use of this invention as no carbon will be formed on the valve seats or in the guides.

The upper bearing 12 will be absolutely free of carbon deposits. By the use of this invention warping of the valves is overcome and the valves will require very little, if any, grinding.

Attention is directed to the fact that the threaded portion of the bushing 14 extends into the cylinder block 9 for a substantial distance so that the heat, relative expansion, and vibration caused by the operation of the motor will not result in the breaking of the bearing portion of the bushing. That is to say, the upper portion of the bushing 14 is substantially strengthened and reinforced by being extended a substantial distance into the block 9.

What is claimed is:—

In an internal combustion engine having vertically reciprocating valves and sp'ash system lubrication, the combination with a boss formed integral with the engine block and extending vertically into a splash chamber, of a bushing rigidly secured in said boss and projecting at its ends beyond the upper and lower ends of the boss, a valve stem disposed for vertical reciprocation through said bushing, said stem being of uniform diameter throughout its length, a bearing for said stem formed in and by the upper projecting end of said bushing above the boss, said bushing being formed into an annular chamber surrounding said stem from said upper bearing to the extreme lower end of the bushing, an internally threaded portion formed on the walls of said chamber from the extreme lower end thereof upward to a point above the horizontal plane of the lower end of said boss, a replaceable bearing over said stem, and a reduced externally threaded portion on said replaceable bearing for engagement with the internally threaded portion at the lower end of said bushing, said externally threaded portion of the replaceable bearing extending within the bushing to a point above the lower end of said boss.

In testimony whereof I affix my signature.

WILLIAM A. DISCH.